United States Patent [19]

Michelotti

[11] Patent Number: 4,835,857
[45] Date of Patent: Jun. 6, 1989

[54] BICYCLE DISK WHEEL AND PROCESS FOR THE CONSTRUCTION THEREOF

[75] Inventor: Guido Michelotti, Vicenza, Italy

[73] Assignee: Micromag S.P.A., Vicenza, Italy

[21] Appl. No.: 40,167

[22] Filed: Apr. 16, 1987

Related U.S. Application Data

[62] Division of Ser. No. 763,262, Aug. 6, 1985.

[30] Foreign Application Priority Data

Sep. 10, 1984 [IT] Italy ................................ 22586 A/84

[51] Int. Cl.$^4$ .............................................. B21K 1/32
[52] U.S. Cl. .................................. 29/159 R; 29/159.01
[58] Field of Search .......................... 29/159 R, 159.01;
  301/37 S, 37 S A, 54, 55, 63 R, 63 DD, 63 DS,
  63 DW

[56] References Cited

U.S. PATENT DOCUMENTS

| | | | |
|---|---|---|---|
| 1,476,968 | 12/1923 | Herle | 301/63 DD |
| 3,004,798 | 10/1961 | Tylle | 301/37 S |

FOREIGN PATENT DOCUMENTS

| | | | |
|---|---|---|---|
| 683551 | 6/1930 | France | 301/63 DD |
| 2416125 | 5/1979 | France | 301/63 PW |
| 9580 | of 1892 | United Kingdom | 301/55 |
| 7296 | of 1901 | United Kingdom | 301/55 |
| 8700802 | 2/1987 | World Int. Prop. O. | 301/37 SA |

*Primary Examiner*—Timothy V. Eley
*Assistant Examiner*—Frances Chin
*Attorney, Agent, or Firm*—Young & Thompson

[57] ABSTRACT

A disk wheel for bicycles, especially sports and competition bicycles, comprises a hub rotatable on a pin fixed to the bicycle fork, a rim carrying a tire and a connector in tension between the hub and the rim. The connector consists of two conical tensioned sidewalls, made of synthetic resin reinforced with radial fibers and firmly anchored to the hub and to the rim.

1 Claim, 1 Drawing Sheet

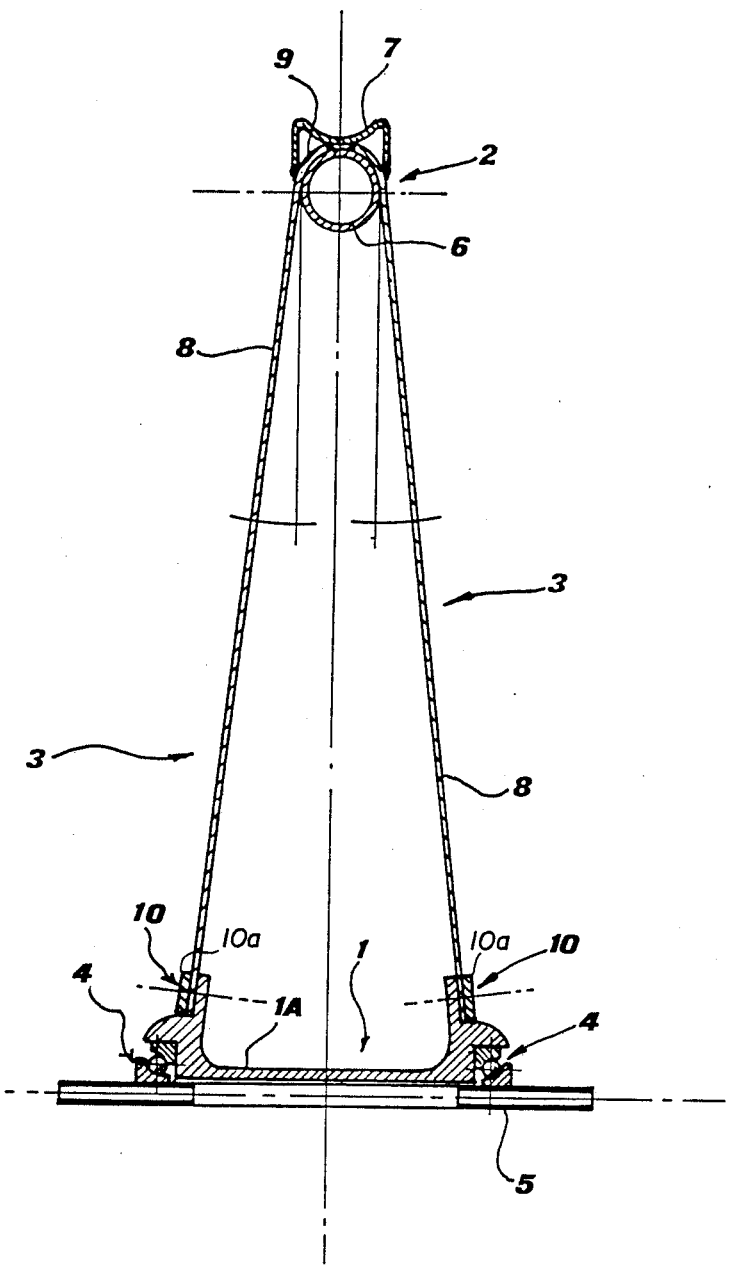

BICYCLE DISK WHEEL AND PROCESS FOR THE CONSTRUCTION THEREOF

This application is a division, of application Ser. No. 763,262, filed 8/6/85.

BACKGROUND OF THE INVENTION

It is known that conventional wheels for bicycles essentially comprise a rim carrying the tire which rolls on the ground, a hub rotatable on a pin fixed to the bicycle frame, and a plurality of spokes connecting the rim to the hub. More precisely, such wheels are composed of a group of elements comprising: a rim for the tire, carrying rest bushings for the anchorage and tension nipples; a series of internally threaded nipples; a series of spokes, anchored at one end with a riveted head to either of the two flanges of the hub, and having the opposite end threaded to be stretched by the rotary and screwing action of said nipples; and a hub having two flanges, with holes arranged over a circumference for inserting and fixing the spokes therein.

On wheels of this type - used in the cycling field for many years - several studies have been made to provide the wheel with a good capability to absorb impacts for the cyclist's comfort, with an adequate stoutness and with the greatest possible lightness, compatibly with the strength of the whole structure. Though resorting to all the technologies applicable in this field and to the classical or most modern and sophisticated materials, with low ratio between the weight and the mechanical characteristics, the possibilities of weight reduction are nevertheless few.

The problem of reducing the weight in these wheels - especially in those having to be mounted on racing and competition bicycles and in those designed for use by the ever increasing number of demanding sportsmen - is therefore still unsolved and it forms the object of greatest consideration by the designers and producers of bicycle wheels.

On the other hand, the traditional spoked wheels considered heretofore, offer a remarkable drag, which recent studies have proved to rapidly increase with speed, and the importance of which - disregarded up to a few years ago - now forms the object of the most careful consideration by the skilled in the art, in view of the even decisive influence which the aerodynamic behaviour of the wheels can have during races and competitions, particularly those in which high speed limits are reached, even for a short while. It is known that, in order to improve this behaviour, various types of disk wheels have been realized, wherein the connection between the wheel hub and the rim is no longer obtained through spokes, but through a disk or through a pair of flat or curved walls (lenticular wheels). In wheels of this type produced up to date -almost always designed for special purposes or even for specific experiments - the problem of lightness has never been taken into account, as it often has no influence at all on the specific results having to be achieved, whereby said wheels are all rather heavy and anyhow far heavier than the ordinary spoked wheels, and this makes them totally inadequate for normal use.

It can therefore be said that the two problems currently more felt in the planning and construction of wheels for bicycles designed for sports use and especially competitions - namely the problem of obtaining combined stoutness and lightness of the wheel and the problem of obtaining a low drag - have up to date been faced separately and with conventional means; the first problem, by operating on a typical spoked wheel structure and by simply acting on the gradually improving properties of the materials available and on the more advanced techniques for their production, and the second problem, by adopting an original structure in its external configuration, but obtained without a rational consideration and, least of all, an accurate study of its responses to stresses, and sometimes even disregarding the requirements of strength and lightness.

SUMMARY OF THE INVENTION

The present invention now provides an overall solution to the aforespecified problems, answering and simultaneously satisfying the requirements currently more felt in the field of wheels for bicycles designed for sports use and especially competitions.

In other words, the present invention supplies a wheel for bicycles which is at the same time very stout, very light and highly aerodynamic, and the use of which - in sports activities in general, and during races and competitions in particular - always favours the cyclist, reducing his fatigue and guaranteeing his safety.

Said wheel is of the type comprising a rotatable hub, a rim for the tire and stressed tension means connecting the hub and the rim, and it is characterized in that said connection means consist of two inclined flat side walls stressed in tension, made of synthetic resin reinforced with radial fibres and firmly anchored to the hub and to the rim.

Preferably, said sidewalls are formed by impregnating with synthetic resin fabrics made of fibres highly resistant to tensile stress, as carbon or kevlar fibres.

According to a first embodiment of the invention, said sidewalls are distinct, equally or differently inclined, and connected separately, at one end, to the flanges of the hub - for instance by mechanical means - and, at the other end, to the wheel rim, for instance by gluing.

According to a second embodiment of the invention, said sidewalls are obtained, equally or differently inclined, from a single element having the ends fixed - for instance by mechanical means - to the hub flanges, and wound at its center all around the rim for connection thereto, said rim being formed of a circle-bent metal alloy tube and of a channel section, also circle-bent and glued on the rim over said element.

A process for the construction of said wheel is characterized - in the case of the first wheel embodiment - in that each of said sidewalls is formed, with the desired inclination, by applying on a mold, one beside the other and partially overlapping, a plurality of triangular elements of fibre fabric pre-impregnated with resin, so as to obtain a truncated cone which is then polymerized; in that the wheel rim is compressed with a set of pistons, until its radius is suitably reduced; and in that each sidewall is mechanically connected to the hub flanges and is connected by gluing to the compressed rim.

In the case of the second wheel embodiment, the process for the construction thereof is characterized in that said single element with flat sidewalls is formed of synthetic resin reinforced with radial fibres, so as to freely contain the rim therein; in that polymerization is carried out; in that the ends of said element are mechanically fixed to the flanges of the hub; and in that said flanges are drawn apart to stretch the sidewalls, giving them the wanted inclination, and to compress the rim.

BRIEF DESCRIPTION OF THE DRAWING

The invention will now be described in further detail, with reference to the accompanying DRAWING; which shows an axial cross-section view of one half of the wheel for bicycles according to the invention.

DESCRIPTION OF THE PREFERRED EMBODIMENT

As shown in the drawing, the wheel according to the invention comprises a hub 1, a rim 2, and two walls or sides 3 connecting the hub 1 to the rim 2.

The hub 1 comprises a cylindrical body 1A rotatable, by way of ball bearings 4, about a pin 5 fixed to the end of a fork of the bicycle in known manner.

The rim 2 is composed of a light alloy tube 6, wound in a circle to form a toroidal surface adapted to bear compression loads, and of a channel section 7, also wound in a circle and connected to the external part of the tube 6 in the manner better described hereinafter.

According to the invention, the two sidewalls 3 are formed of one or more elements 8 of resin reinforced with radial fibres, mounted radially stretched between the tube 6 - which is thereby placed in compression - and the hub 1, to which tube and hub they are firmly and efficiently anchored. In the case shown in the drawing, a single element 8 is used to form said flat sidewalls 3. Said element 8, obtained from one or more layers of fibre fabric impregnated with resin - it is normally preferable to use pre-impregnated fibre fabric, to facilitate construction - winds at 9, practically in its centre, around the tube 6 of the wheel rim, while its ends are mechanically fixed onto the flanges 10 of the hub 1.

Alternatively, two distinct sidewalls can be used, anchored like the single element 8 to the hub 1 and glued, or otherwise connected in a stable and safe manner to the tube 6.

The inclination of the two sidewalls 3 can be equal or different, according to the camber having to be obtained. When said camber differs, the tractive effort which the two sidewalls have to exert will vary (the force of the less inclined sidewall being higher); in this case, it may be convenient to vary the number of the fibre fabric layers used for one sidewall, in respect of those used for the other sidewall. The fibre fabrics to be used may be chosen among Kevlar fabrics and those of carbon fibre, or others still may be used, but they will in any case have to offer high resistance to tensile stress. As already said, they will preferably be fabrics of fibre pre-impregnated with resin.

The channel section 7 for the tire may be applied by gluing on the tube 6, externally thereof and directly onto its surface or, as shown in the drawing, over the fabric of the single element 8 forming the sidewalls 3, which winds around said tube 6.

Said channel section may be made of light alloy, for competitions requiring the use of brakes, or of reinforced resin, for competitions which, like those on a cycling-track, do not require the use of brakes.

A structure like that described, as well as providing all the advantages of the already known disk wheel structures, from the aerodynamic point of view, also allows a far more rational distribution of the stresses and guarantees, thanks to this distribution and thanks to the materials used, a far higher strength/weight ratio than in the conventional wheels.

It is known, in fact, that the rim of spoked wheels is placed in compression by the action of the spokes - which, as known, are in tension - and the forces in the rim plane balance the tension of the pulling spokes with the resistance to the reduction of the diameter of the compressed rim.

The spokes however impart their pull on reaction elements of the rim proportional to their number. Hence, each circle arc is stressed by a pull concentrated in its summit.

Said arc can practically be considered an arched beam with elastic bearings fixed in the center line between two spokes and with load concentrated at the centre.

Furthermore, for the stability of the rim, which in operation has to take up lateral thrusts, it is necessary to provide the spokes with a camber and alternatively distribute them to the right and to the left. The aforementioned arched beam must therefore also withstand the component of the pull of the spoke perpendicular to the plane of the rim. This produces further stresses to the right and to the left of each arched element with the load concentrated in the center.

It is known that a beam on two bearings, with load concentrated in the center, should have a higher moment of inertia and a higher section modulus than a similar beam bearing a load of equal weight but evenly distributed.

The wheel according to the invention allows obtaining a load evenly distributed on the rim because of its sidewalls 3 which, thanks to their structure and configuration, clearly impose a compressive stress on the rim which is evenly distributed about its whole periphery. This hence allows unburdening the section of the wheel rim formed by the tube 6. Moreover, since the weight of the sidewalls 3 - which are made of fibre fabric impregnated with resin - is equal to about half the weight of the metal spokes which, in the conventional wheel, impart the same pull, it can easily be understood what great improvement the wheel according to the invention achieves.

It should be noted that the previously considered case, though not expressly pointed out, refers to a wheel wherein the sidewalls 3 are in continuous form. The invention however also contemplates the case wherein the sidewalls 3 have gaps in the form of holes, slots or openings in general.

In the process for the construction of the aforedescribed wheel, it has been necessary to overcome quite a few difficulties.

The use of fibre fabric impregnated with resin, to form the wheel sidewalls, indeed creates serious problems. It is in fact not possible to impose any tension on said fabric - as required for mounting the wheels - until the resin contained in the fibre has been polymerized. One may thus alternatively use the two following techniques - either disposing the pre-impregnated fabric over a mold, to give it the due shape; then applying absolute vacuum in an appropriate bell, to remove from the fabric any presence of air in its weft and in the resin impregnating the same; and subsequently placing said fabric in a furnace at about 125° C., for a certain period of time, to obtain polymerization; or disposing the fabric over a mold, as in the previous case; covering the whole with a membrane of airproof flexible material; imposing on said membrane a pressure of a few atmospheres; and subsequently placing in a furnace as above, to obtain polymerization.

In both cases, the product obtained has a slight transverse consistency, but it is ready to be pulled radially between the centre and the periphery in the direction of its radius.

With this product, if adopting the described and illustrated configuration wherein the sidewalls are formed of a single element 8 bent around the rim tube 6, one may proceed as follows to form the wheel. The single element 8 shown in the drawing is formed - by means of side-by-side and partially overlapping triangular elements made of fibre fabric pre-impregnated with resin, with radially positioned fibres - with its sidewalls flat, connected at the outer periphery as in the drawing and housing the rim freely inserted therebetween. Polymerization is then carried out as said. The end edges of the fabric, corresponding to the inner peripheries of the sidewalls, are then locked, axially movably, into the flanges of the hub 1. Said flanges, initially drawn close, are now gradually moved apart (for the purpose, they simply have to be screwed on the hub thanks to specially provided threadings). Thus, the two sides are radially stressed in tension, and the rim is compressed at the same time. The operation is carried on up to reaching the wanted camber (and, of course, the proper tensions in the sidewalls and compression in the rim).

In the event, instead, of having to provide for a different type of connection between the sidewalls 3 and the tube 6 - i.e. having to connect each sidewall separately, for instance by gluing - each sidewall should be previously given its final shape. In this case one proceeds as follows: triangular fabric elements are placed - one beside the other and partially overlapping, with radially disposed fibres - into a circular mold having a conical shape corresponding to the wanted camber. A right circular truncated cone is thereby obtained, with the base corresponding to the outer periphery of the rim on which it has to be glued and being centrally provided with a counter flange 10a, suitably prearranged at the centre of said mold for mechanical connection to the hub flanges 10. The diameter of the cone base is smaller than the final balance diameter, to the extent required to reach the desired stretched condition on increasing the diameter itself.

After both sidewalls have been polymerized, with said dimensions, one provides to assemble them on the hub and on the rim. After fixing one sidewall to the hub, the rim is radially compressed with a set of pistons positioned to act radially inwardly so as to reduce the rim radius by an amount equal to the sum of the deformations required to obtain, upon its elastic return, the precalculated balance condition between the rim compression and the tension of the two sidewalls.

In such a dimensional configuration of the rim, the sidewalls can extend about said rim in their zone of contact on the toroid. It is then possible, taking care of the alignment, to apply the second sidewall and fix it to the second flange of the hub. With appropriate glues, the whole periphery of the sidewall is anchored to the rim, with outer connection plates between the right sidewall and the left sidewall, between the pairs of pistons compressing the rim.

Once the glue has set, the pistons are released. The whole system reaches the balance reckoned in advance through expansion of the sidewalls obtained by increasing the diameter of the rim.

It is to be understood that there may be other embodiments of the disk wheel according to the invention, as well as other methods and means for the construction thereof, without thereby departing from the scope of the invention itself.

At the end of this description, it is worth while observing how the wheel according to the invention is adapted to solve in an overall and rational manner, and with extremely satisfactory results, all the problems of this essential bicycle component arising from the very strict present requirements in case of using the same for sports activities and especially in competitions. According to the invention, it is in fact possible to obtain a wheel which is at the same time stouter and far lighter than the conventional spoked wheels, and providing besides all the advantages of the conventional disk wheels, from the aerodynamic point of view, without however having their defects.

I claim:

1. A process for the construction of a wheel for bicycles, especially sports and competition bicycles, of the type comprising a hub rotatable on a pin fixed to a bicycle fork, a rim carrying a tire and means connecting the hub and the rim, said process comprising:

forming said connection means of two inclined flat sidewalls made of synthetic resin reinforced with radial fibers;

firmly anchoring said sidewalls to the hub and to the rim; and tension stressing said sidewalls between the hub and the rim, said process further comprising:

forming each of said sidewalls with a desired inclination by applying a plurality of triangular elements of textile fiber pre-impregnated with resin side by side and overlapping on a mold, so as to obtain a truncated cone with outwardly projecting edges;

applying at the center of each of said sidewalls a counterflange for connection to a corresponding flange of the wheel hub;

compressing said wheel rim until its radius has been reduced by a desirable degree;

fitting said two sidewalls onto said compressed rim by enveloping said compressed rim with said outwardly projecting edges and fixing them thereto;

polymerizing said resin by heating the same in an oven while maintaining said compression of said rim;

removing said compression from said rim; and inserting the hub into said wheel by connecting said flanges to said counterflanges so as to draw said flanges and said counterflanges mutually apart.

* * * * *